Dec. 22, 1959     R. M. CARSON     2,918,310
TOWING BAR WITH WIDE-RANGE HITCH
Filed Sept. 10, 1958     2 Sheets-Sheet 1
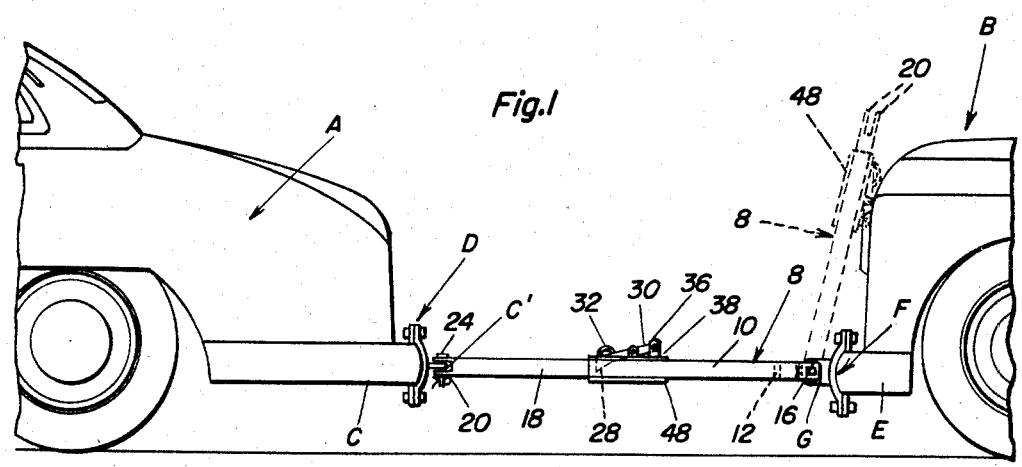
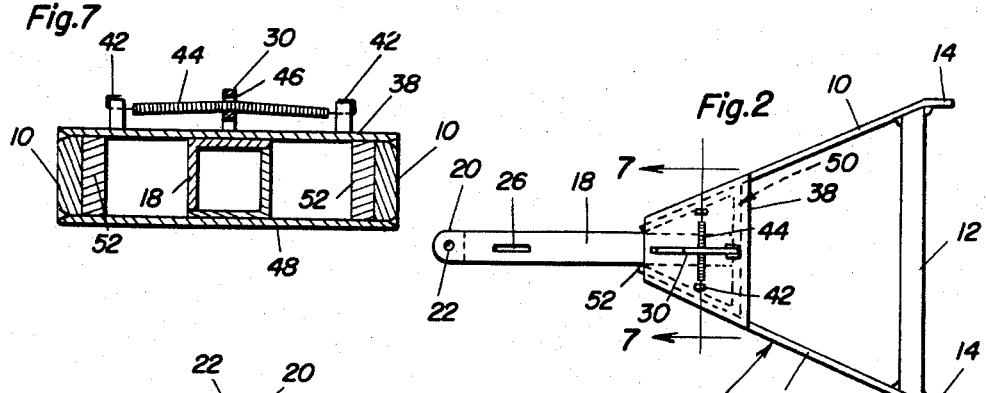
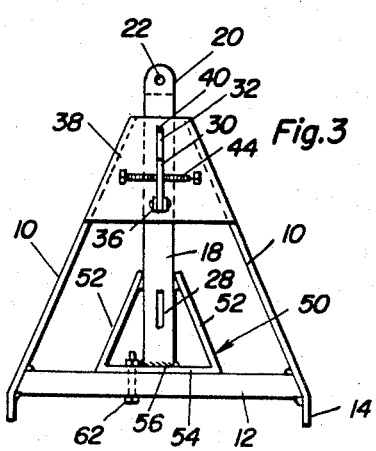
Raymond M. Carson
INVENTOR.

Dec. 22, 1959            R. M. CARSON            2,918,310
TOWING BAR WITH WIDE-RANGE HITCH
Filed Sept. 10, 1958            2 Sheets-Sheet 2
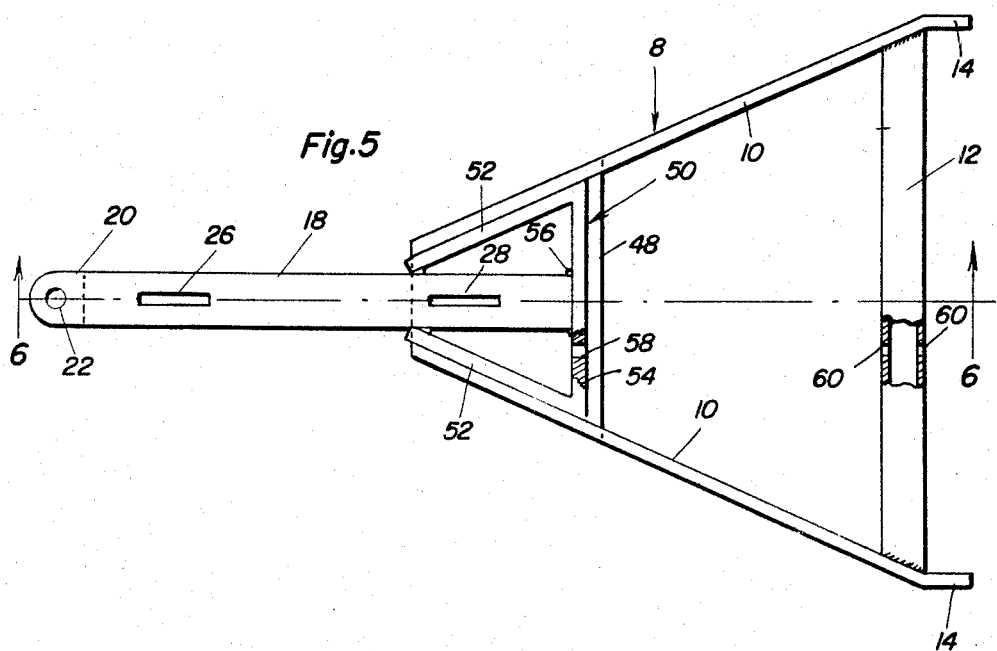
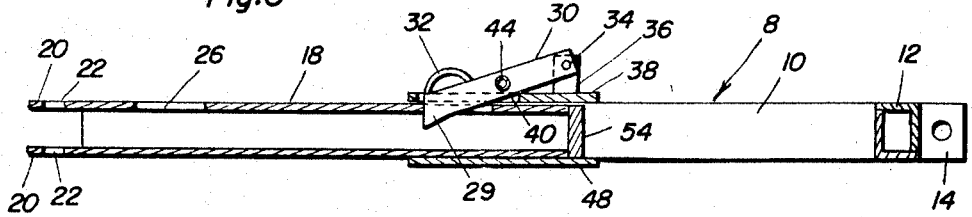
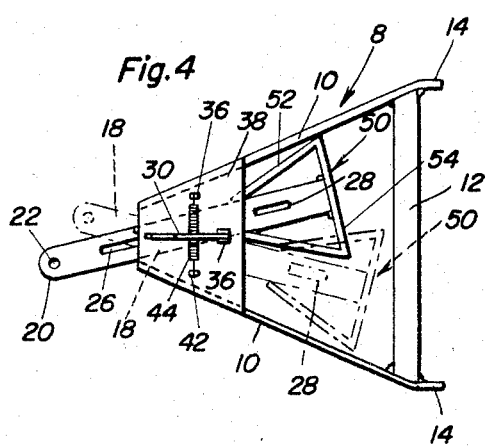
Raymond M. Carson
INVENTOR.

ically apparent from the following description
and the accompanying drawings.

In the drawings, wherein like numerals are employed to designate like parts throughout the views:

Fig. 1 is a side elevation showing the forward end of the vehicle at the right which is to be towed, the rearward end of the leading or vehicle which is to do the towing, and the improved towing bar carried by the first vehicle and equipped with the improved self-adapting wide-range hitching tongue and how the forward end of the latter is joined to the hitching bracket on the second named vehicle;

Fig. 2 is a plan view of the hitching bar and tongue removed, of course, from the vehicle;

Fig. 3 is a plan view based on Fig. 2 and showing how the retractible tongue recedes into the towing bar frame and how it is bolted to stay in the collapsed or retracted position shown;

Fig. 4 is a plan view similar to Fig. 2 but showing the variability of the hitching tongue relative to the towing bar or frame;

Fig. 5 is an enlarged view in plan and in section with parts removed to expose the details of construction, particularly the components of the openable and closable coupling;

Fig. 6 is a section on the plane of the line 6—6 of Fig. 5 illustrating the complete coupling; and Fig. 7 is a cross-section on an exaggerated scale taken on the plane of the line 7—7 of Fig. 2, looking in the direction of the arrows.

With reference first to Fig. 1 it is to be explained that the expression "vehicles" is being used to identify automobiles, pick-ups, tractors and equivalent machines. It will simplify the presentation to denote A as the leading or powering vehicle which is to do the towing, and the vehicle B as the vehicle which is to be towed. The first vehicle is shown provided with a rear bumper or the like C having hitching means such as a bracket D with a connecting member C'. Instead of this arrangement the often-used ball and socket type of a bracket may serve. On the forward bumper E attaching brackets F with lugs G are provided. The invention of course is in combination with these old parts and is illustrated in particular in Figs. 2 to 7 inclusive.

With reference to Fig. 2 the towing bar 8 takes the form of a triangular frame, sometimes also referred to as an A-frame. This frame is characterized by a pair of forwardly converging frame members 10 having their rearward transverse ends connected together by a forwardly placed and suitably joined cross brace 12. The extending rear end portions 14 constitute hinging ears and are hingedly bolted as at 16 so that the frame as a unit may be swung up to an out-of-the-way position when not in use as shown in dotted lines in Fig. 1. The forward end of this towing bar or frame may be said to be truncated. Thus the forward ends of the frame member 10 are spaced apart to accommodate the adjacent slidably associated and telescoping ends of the hitching means, more specifically a linearly straight rigid tongue 18. This tongue may be tubular if desired. The left hand or forward end may vary in construction. It is here shown as having upper and lower ears 20 apertured at 22 to accommodate the hitching pin or bolt 24 in the manner shown in Fig. 1. That is to say the lug G extends between the ears and the bolt is inserted to provide the desired pivoting hitch. Instead of the means shown at D, C' and 20 to 24, inclusive, a ball and socket joint (not shown) may of course be utilized. The median portion of the top of tongue is provided with a latch accommodation slot 26. There is a similar slot 28 at the rearward end portion and this constitutes a keeper for a detent 29 (Fig. 6) on the downward end of a spring held latch 30, the free end portion of the latch being provided with a suitable finger-grip 32. The pivoted end 34 of the latch is joined to upstanding lugs 36 mounted suitably on a substantially triangular top plate 38 which is fixed atop the leading edge portions of the frame members 10. This plate has a slot 40 therein to selectively register with the keeper slots 26 and 28 and to accommodate the detent 29 on the latch. The plate 38 is also provided with appropriate anchors 42 (see Fig. 7) having end portions of a coil spring connected thereto. The coil spring 44 passes through an opening 46 provided therefor in the median portion of the latch 30 and the tension of the spring is such that the detent-equipped end 29 of the latch is normally sprung down and held in its desired retaining position, that is the locking position seen in Fig. 6. It will be noted that the detent is lodged in both slots 28 and 40 and "noses" into the hollow portion of the tongue 18 and directly abuts the forward end of the slot 28. Opposed to the top plate is a second triangular bottom plate 48 which is likewise secured to the frame member and these two plates in conjunction with the frame members form a box-like open ended socket or receiver. This receiver constitutes the female component of the aforementioned coupling means. The other component comprises a triangular head or wedge 50 which is perhaps best shown in Fig. 3. This wedge or head comprises converging side members 52 rigidly welded in place and a base member 54 which is welded at 56 to the adjacent end portion of the tonque. This base member is provided with a bolt hole 58 (Fig. 5) which registers with bolt holes 60 in the aforementioned brace in order to accommodate the retaining bolt 62 which, as shown in Fig. 3, serves to fasten this retractible and projectible tongue in the collapsed out-of-the-way position illustrated. Then with the two parts, the towing bar 8 and tongue 18 collapsed the structure may be folded up and retained in any suitable manner in the out-of-the-way dotted line position seen in Fig. 1.

Using this pivoted A-frame to provide a hingedly mounted towing bar and bracketing it to the bumper C of the drawn vehicle B provides a generally well known type of towing bar. That is to say, an A-frame hingedly mounted on a vehicle such as at B is not in and of itself new. The featured advantages reside in providing a sectional towing connection between two vehicles the sections self-adapting and adjustable and automatically connectable and the specification and disclosure and claims are to be interpreted accordingly. For this reason the part 8 may be thought of as a towing unit or equivalent means. The tongue 18 may be thought of as hitching means. The coupling between the two means 8 and 18 provides the desired self-accommodating and operating connection between towing units which makes for the variability and angularly relationship of parts seen in Fig. 4. By simply unlatching the means 18 it may be permitted to telescope or recede into the means 8 and swung from one side to the other to assume whatever angle is necessary to line it up with the hitching means D on the pulling vehicle A. Then when A "takes off" the wedge or head 50 is piloted into the socket and is sheathed, firmly lodged and latched therein in the rigid ready-to-function manner seen in Fig. 6.

So far as is known the provision of tow bar means 8, and hitching means 18, with a self-adaptable coupling and operating connection between the adjacent ends thereof is novel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use between adjacent ends of separably connectible vehicles; a hitch comprising a rigid towing device having means at a rearward end thereof permitting said rearward end to be operatively hinged on the front end of a drawn vehicle, a rigid push-pull hitching and towing tongue slidably related to said towing device and having means at its forward end adapted to be separably and operatively connected with a pulling vehicle, and a self-adapting wide-range coupling between adjacent overlapping portions of said towing device and tongue and which allows said tongue when not coupled to be laterally angled and self-adjusted relative to the line of draft and said towing device whereby to expedite connecting the hitching and towing tongue with the pulling vehicle, said coupling embodying a female coupling member at the forward end of said towing device and a male coupling head fixed on the rearward end of said towing tongue, said tongue being provided adjacent said male coupling head with a keeper slot, a manually releasable spring-biased and retained latch operatively mounted on said female coupling member and releasably engageable with said keeper slot, said female coupling member comprising a truncated triangular sheath defining and providing a wedge-like socket and retainer for telescopic reception and retention of said male coupling head, said coupling head being wedge-shaped and conforming in shape and size with said socket, said male coupling head being forcibly drawn into said socket by the forward movement and extension of the major portion of the tongue through and forwardly beyond the forward truncated end of the female coupling member, and the pulling and towing forces of the over-all hitch being attained and maintained by way of the direct interengagement of the cooperating faces of the head and female coupling member.

2. The structure defined in claim 1 and wherein said latch, when engaged in said keeper slot functions in a maner to prevent disengagement of the coupling members, said latch serving primarily as the means which maintains the coupling members effective when a rearward thrust is imposed on the tongue.

3. For use between adjacent end portions of separably connectible vehicles; a rigid female coupling member hollow and generally triangular in plan and having a truncated forward end providing a wedge-shaped socket, means rigidly connected with said female coupling member and serving to hingedly connect said coupling member with the front end of a drawn vehicle, a forwardly extensible rearwardly retractible push-pull tongue slidably mounted intermediate its end portions in the socket of said female coupling member and having means at the forward end thereof for effecting an operating connection with a pulling vehicle, the rearward end of said tongue being provided with a wedge-shaped male coupling head which, when in use, fits and is wedged snugly and operatively in said socket, said female coupling member having a slot therein, a manually releasable spring-biased automatically applicable latch mounted atop said female coupling member and having a detent projectible through the slot into said socket, said tongue being hollow and provided at longitudinally spaced points with forward and rearward selectively usable keeper slots for removable reception of the detent, the means connecting said female coupling member with the first named vehicle comprising an A-frame embodying a pair of forwardly converging frame members connected at their converging forward ends to said female coupling member, the rearward ends of said frame members being connected by a stabilizing cross brace defining said A-frame, said tongue and male coupling head being adapted to be manually shoved rearwardly through the said female coupling member in a manner to cause said head to rest directly against said cross brace, said head being separably connected to said cross brace by cooperating fastening means, whereby to permit the head and tongue to be retracted and substantially withdrawn into the confines of the A-frame whereupon the frame and tongue, as a unit, may then be bodily swung up to and maintained in an out-of-the-way not-in-use position.

4. For use between adjacent ends of separably connectible vehicles, a hitch construction comprising a towing bar embodying a frame generally triangular in plan, said frame having a pair of forwardly converging frame members with their forward converging ends spaced apart, the rearward ends of said frame members being likewise spaced apart and connected by a coplanar rigidifying cross brace, top and bottom truncated triangular plates fixed in spaced parallelism on the respective top and bottom surfaces of the forward converging ends of the frame members and cooperating therewith in providing a wedge-shaped female coupling member, the top plate being provided with a slot, an accessible manually releasable spring-biased latch having a rearward end hingedly mounted atop said top plate and having a forward end operating through said slot and constituting a detent, said detent being spring-biased into the socket portion of said female coupling member, an elongated extensible and retractible rigid linearly straight push-pull tongue operable through the open ends of the female coupling member and provided with forward and rearward longitudinally spaced keeper slots to selectively accommodate said detent, the rearward end of said tongue being provided with a wedge-shaped head, said head being wedged and removably but firmly lodged in the socket portion of said female coupling member, said detent being releasably engaged with the then cooperating rearward keeper slot to prevent rearward sliding movement of the forwardly extending tongue, the extending tongue and resultant interengagement of the cooperating faces of the head and female coupling member providing the sustained pulling forces of the overall hitch, said latch serving to guard against the above mentioned rearward sliding movement of the tongue when the pulling vehicle is being backed relative to the drawn vehicle.

References Cited in the file of this patent

UNITED STATES PATENTS

| | | |
|---|---|---|
| 2,378,504 | Roos | June 19, 1945 |
| 2,703,243 | Clark | Mar. 1, 1955 |
| 2,845,281 | Holder et al. | July 29, 1958 |

FOREIGN PATENTS

| | | |
|---|---|---|
| 586,883 | Great Britain | Apr. 3, 1947 |